United States Patent
Dunlap et al.

(10) Patent No.: US 11,172,439 B2
(45) Date of Patent: Nov. 9, 2021

(54) METHOD FOR INTELLIGENT ROAMING IN A CLIENT STATION OVER SINGLE OR MULTIPLE WLANS

(71) Applicant: Intel Corporation, Santa Clara, CA (US)

(72) Inventors: Wayne Grosvenor Dunlap, Austin, TX (US); James Ho Wang, Austin, TX (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 16/808,608

(22) Filed: Mar. 4, 2020

(65) Prior Publication Data
US 2021/0282085 A1  Sep. 9, 2021

(51) Int. Cl.
*H04W 4/00* (2018.01)
*H04W 48/20* (2009.01)
*H04W 36/24* (2009.01)
*H04W 48/16* (2009.01)
*H04W 84/12* (2009.01)

(52) U.S. Cl.
CPC ........... *H04W 48/20* (2013.01); *H04W 36/24* (2013.01); *H04W 48/16* (2013.01); *H04W 84/12* (2013.01)

(58) Field of Classification Search
CPC ..... H04W 48/16; H04W 48/20; H04W 36/24; H04W 36/0011; H04W 36/18; H04W 36/14; H04W 36/08; H04W 8/04
USPC ............... 455/435.2, 436, 437, 438; 370/331
See application file for complete search history.

(56) References Cited

U.S. PATENT DOCUMENTS

| | | | |
|---|---|---|---|
| 2009/0075656 A1* | 3/2009 | Tolli ..................... | H04B 17/318 455/436 |
| 2009/0303891 A1* | 12/2009 | Lucas ............. | H04W 36/00835 370/252 |
| 2015/0201360 A1* | 7/2015 | Ray Chaudhuri .... | H04W 36/30 455/436 |
| 2015/0373637 A1* | 12/2015 | Wang ..................... | H04W 48/12 455/422.1 |
| 2016/0135205 A1* | 5/2016 | Barbu ................... | H04W 48/20 370/338 |
| 2017/0332302 A1* | 11/2017 | Ercan .................. | H04W 36/305 |
| 2020/0120458 A1* | 4/2020 | Aldana ................. | H04W 36/08 |
| 2020/0296643 A1* | 9/2020 | Mukherjee .......... | H04L 65/1069 |

* cited by examiner

*Primary Examiner* — Temica M Beamer
(74) *Attorney, Agent, or Firm* — Shichrur & Co.

(57) ABSTRACT

An method for a wireless station to select an access point among a plurality of access point possibilities using a combination of characteristics about each access point such as signal strength, access point load, protocol, maximum throughput, multi-user MIMO capability, and channel load.

15 Claims, 3 Drawing Sheets

METHOD FOR INTELLIGENT ROAMING IN A CLIENT STATION OVER SINGLE OR MULTIPLE WLANS

BACKGROUND

Field of the Disclosure

The present disclosure relates to wireless networks such as networks described by the IEEE 802.11 standard and more particular to the method of selecting an access point (AP) used by an endpoint (commonly referred to as a station).

Description of the Related Art

In local area networks with multiple access points there are 2 common problems, figuring out which access point a new station should connect to and when to switch a station from one access point to another. The common approaches to solving these issues are the centralized approach and the de-centralized approach. In the centralized approach the access points communicate, usually via a controller and "steer' the station to the access point the controller has deemed the best selection. The de-centralized approach is much more common and is where the station scans for the access points available and the station selects the best access point Stations find potential access points because potential access points send out broadcast packets (beacons) at regular intervals so that the stations know about potential access points. These beacons contain the name of the access point, access point loading information, and other information. The station then uses the beacon to determine the signal strength of the access point and potentially the loading information in the access point to determine which access point to select. All de-centralized algorithms have a few things in common. They select and switch access points based on signal strength and loading of a given access point and they only consider access points on the same local area network. Switching access points on the same network is known as roaming.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
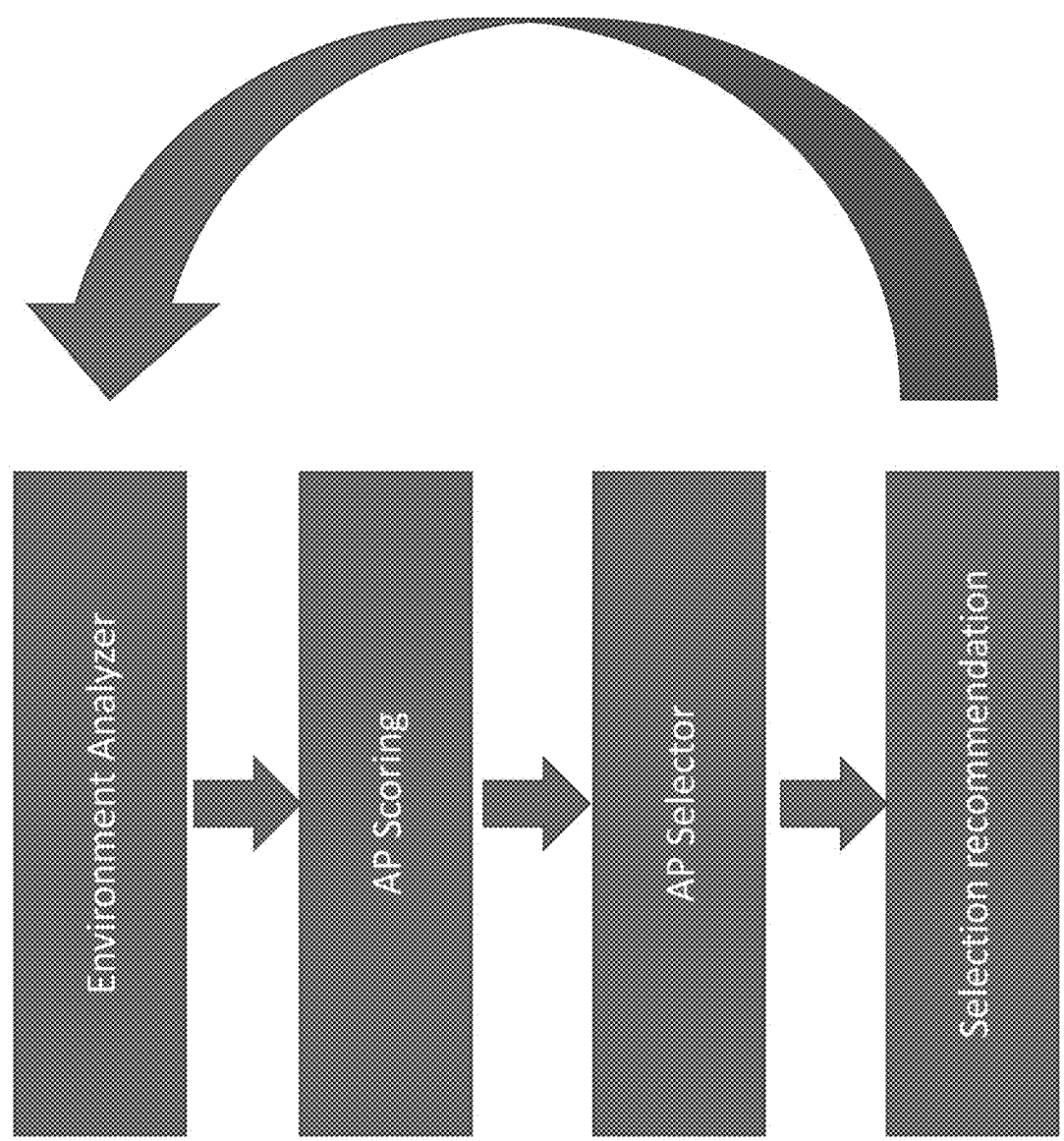
FIG. 1 is a block diagram of one possible illustration of an access point selection systems

FIG. 1 illustrates one possible implementation of a network access point scoring system. There is a module that takes in all the environmental data (Environmental Analyzer) and organized it into component values. So, for example, if it received beacon from a potential access point it would forward key information from that beacon such as the channel, the signal strength, maximum potential throughput, etc. to the AP Soring module.

The AP Scoring module then collects all that information and then scores environmental factors as well as individual access points. So, for example, the AP Scoring module may determine that certain channels have no noise and so should be valued more highly than other channels. The AP Scoring module then passes a ranked list of APs along with their scores to the AP Selector module.

The AP Selector module looks at the potential gain for switching access points and weighs that against other factors such as when the last AP switch occurred, how big the gain is likely to be, as well as what applications are currently active. These are just examples of the kinds of things that can affect the decision to recommend a switch. If a recommendation is warranted, it passes the recommendation on to the Selection Recommendation module.

The selection recommendation module then can prompt the user to see if they want to switch access points or switch the user automatically.

Figure 2:
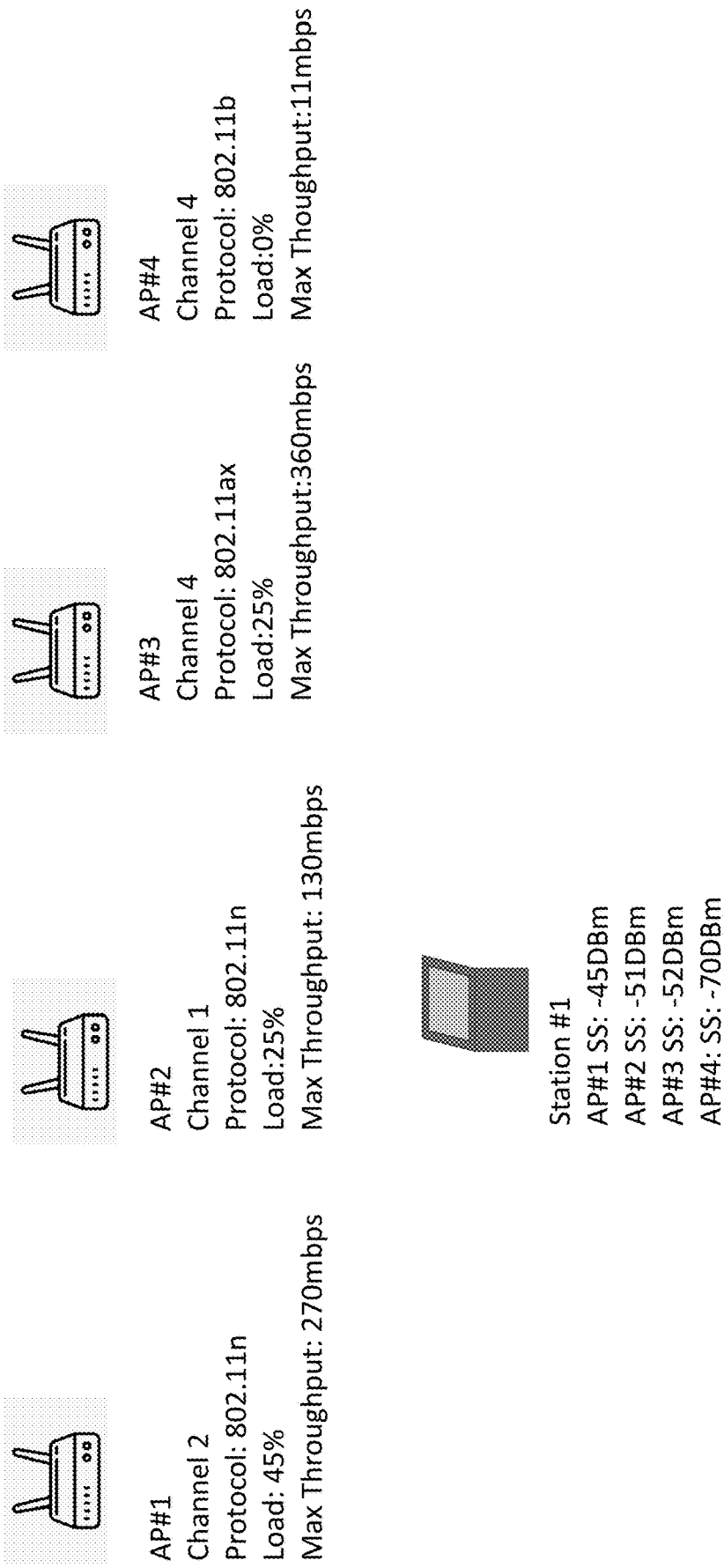
FIG. 2 is an example of a station in an environment of 4 possible choices for access points to join a specific network.

To see how this would work in practice see FIG. 2. This figure is an example of a station that is in range of 4 network access points. In a typical AP selection algorithm in the market today, the station scans the wireless channels for the AP with the highest signal strength, and in this example would pick AP #1 (it has the highest signal strength). A high end, sophisticated AP selection algorithm in the market today would also look at the loading and in this case may select AP #2. However, considering all the available information, the station would, most likely, have the best networking experience as defined by highest throughput, lowest latency and lowest jitter, on AP #3. While it has a lower signal strength than AP #1 and AP #2, it has a higher maximum throughput and it uses a more sophisticated communication protocol (802.11ax) which handles load much better than the other access points. The invention disclosed herein would account for these factors in scoring and select AP #3.

The example in FIG. 2 is for the initial connection to the network. But the algorithm would run continuously to look for opportunities to improve the station's network connection as the environment can change. More stations could connect to the same access point or the station could physically change locations. As this happens, the algorithm needs to make sure the benefit of switching access points is significant. The algorithm also needs to prevent things like constantly switching access points, giving the user a bad experience.

Historical information could also improve the stations access point selection algorithm. For example, if a specific access point was prone to a bad networking experience, such as getting a high percentage of packet receive errors, the AP Scoring module could take this into account and lower the score of that access point.

It is often the case that stations use only resources available on the public internet. In this case, the reason to connect to a Local Area Network (LAN) is simply to get access to the public internet. The architecture shown in FIG. 1 would be extended to evaluate access points from multiple networks. One of the criteria for scoring the access points could be if it is on the same LAN, but that would just be another factor.

Figure 3:
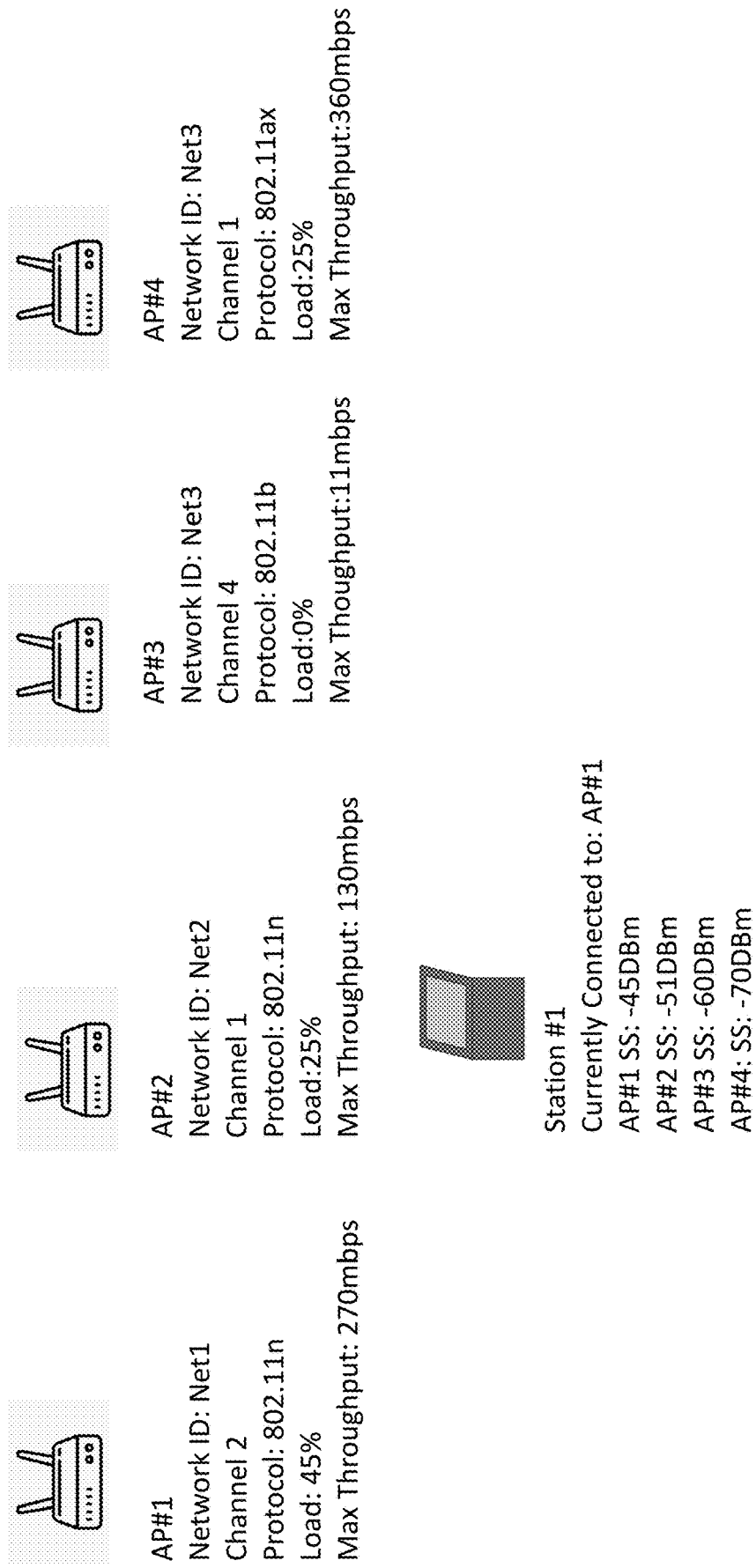
FIG. 3 is an example of a station with 4 possible was to access 3 different networks.

FIG. 3 shows an example of multiple access points on multiple LANs. There are 3 LANs, Net1, Net2 and Net3 with Net3 having 2 access points, AP #3 and AP #4. Some examples of how the algorithm decides which LANs to include in the access point selection process include LANs the station has connected to in the past or LANs without a credential requirement, or all access points within range.

This invention is agnostic in this regard. In this figure, Station #1 is currently connected to AP #1. For the industry standard roaming case, none of the other access points would be considered. For this invention, all the access points would be considered and, since AP #4 is a significantly better choice given all the information in the figure, would most like, be selected.

As with the single LAN case, the multiple LAN case would continuously run the selection algorithm looking for better access points to improve the network connectivity for the station. The algorithm would protect against lower value switches and switching too often.

As mentioned in the single LAN case, historical information could be used in this case too to provide for better access point selection across networks.

What is claimed is:

1. A method to be performed at a station to access a Wireless Local Area Network (WLAN), the method comprising:
   determining, according to a benefit function, a plurality of access point scores corresponding to a plurality of access points giving access to the WLAN, the benefit function based on a scoring mechanism to assign weights to three or more qualities corresponding to an access point, the three or more qualities corresponding to the access point comprising at least three qualities selected from the group consisting of signal strength, a load of the access point, a load of other access points on the same wireless channel as the access point, a number of access points on the same wireless channel as the access point, a maximum data rate of a connection to the access point, protocols supported by the access point, and security protocols supported by the access point; and
   determining a selected access point for network access, the selected access point with a highest access point score of the plurality of access point scores.

2. The method of claim 1, comprising:
   continuously monitoring one or more of the plurality of access point scores; and
   based on a determination that there is a candidate access point with a higher score than a currently associated access point, switching an association to the candidate access point with the higher score.

3. The method of claim 1, wherein:
   the benefit function is configured to account for a networking experience of a previously connected access point to boost or drop a score of the previously connected access point.

4. The method of claim 1 comprising:
   requiring that a score of a potential candidate access point be better than a currently associated access point by a minimum score differential for allowing the station to switch to the potential candidate access point.

5. The method of claim 1 comprising:
   preventing the station from switching rapidly between access points in a highly variable environment.

6. A method to be performed at a station to select access points on multiple networks, the method comprising:
   determining, according to a benefit function, a plurality of access point scores corresponding to a plurality of access points giving access to a plurality of Wireless Local Area Networks (WLANs), the benefit function based on a scoring mechanism that assigns weights to three or more qualities corresponding to an access point, the three or more qualities corresponding to the access point comprising at least three qualities selected from the group consisting of signal strength, a load of the access point, a load of other access points on the same wireless channel as the access point, a number of access points on the same wireless channel as the access point, a maximum data rate of a connection to the access point, protocols supported by the access point, security protocols supported by the access point, and one or more other noise sources on the same wireless channel as the access point; and
   determining a selected access point for network access, the selected access point with a highest access point score of the plurality of access point scores.

7. The method of claim 6 comprising:
   continuously monitoring one or more of the plurality of access point scores; and
   based on a determination that there is a candidate access point with a higher score than a currently associated access point, switching an association to the candidate access point with the higher score.

8. The method of claim 6, wherein the benefit function is configured to account for a networking experience of a previously connected access point to boost or drop a score of the previously connected access point.

9. The method of claim 6 comprising:
   requiring that a score of a potential candidate access point be better than a currently associated access point by a minimum score differential for allowing the station to switch to the potential candidate access point.

10. The method of claim 6 comprising:
    preventing the station from switching rapidly between access points in a highly variable environment.

11. An apparatus for use by a station to access a Wireless Local Area Network (WLAN), the apparatus comprising:
    a processor configured to:
       determine, according to a benefit function, a plurality of access point scores corresponding to a plurality of access points giving access to the WLAN, the benefit function based on a scoring mechanism to assign weights to three or more qualities corresponding to an access point, the three or more qualities corresponding to the access point comprising at least three qualities selected from a group consisting of signal strength, a load of the access point, a load of other access points on the same wireless channel as the access point, a number of access points on the same wireless channel as the access point, a maximum data rate of a connection to the access point, protocols supported by the access point, and security protocols supported by the access point; and
       determine a selected access point for network access, the selected access point with a highest access point score of the plurality of access point scores.

12. The apparatus of claim 11, wherein the processor is configured to:
    continuously monitor one or more of the plurality of access point scores; and
    based on a determination that there is a candidate access point with a higher score than a currently associated access point, switch an association to the candidate access point with the higher score.

13. The apparatus of claim 11, wherein the benefit function is configured to account for a networking experience of a previously connected access point to boost or drop a score of the previously connected access point.

14. The apparatus of claim 11, wherein the processor is configured to:

require that a score of a potential candidate access point be better than a currently associated access point by a minimum score differential for allowing the station to switch to the potential candidate access point.

15. The apparatus of claim 11, wherein the processor is configured to:
prevent the station from switching rapidly between access points in a highly variable environment.

* * * * *